UNITED STATES PATENT OFFICE.

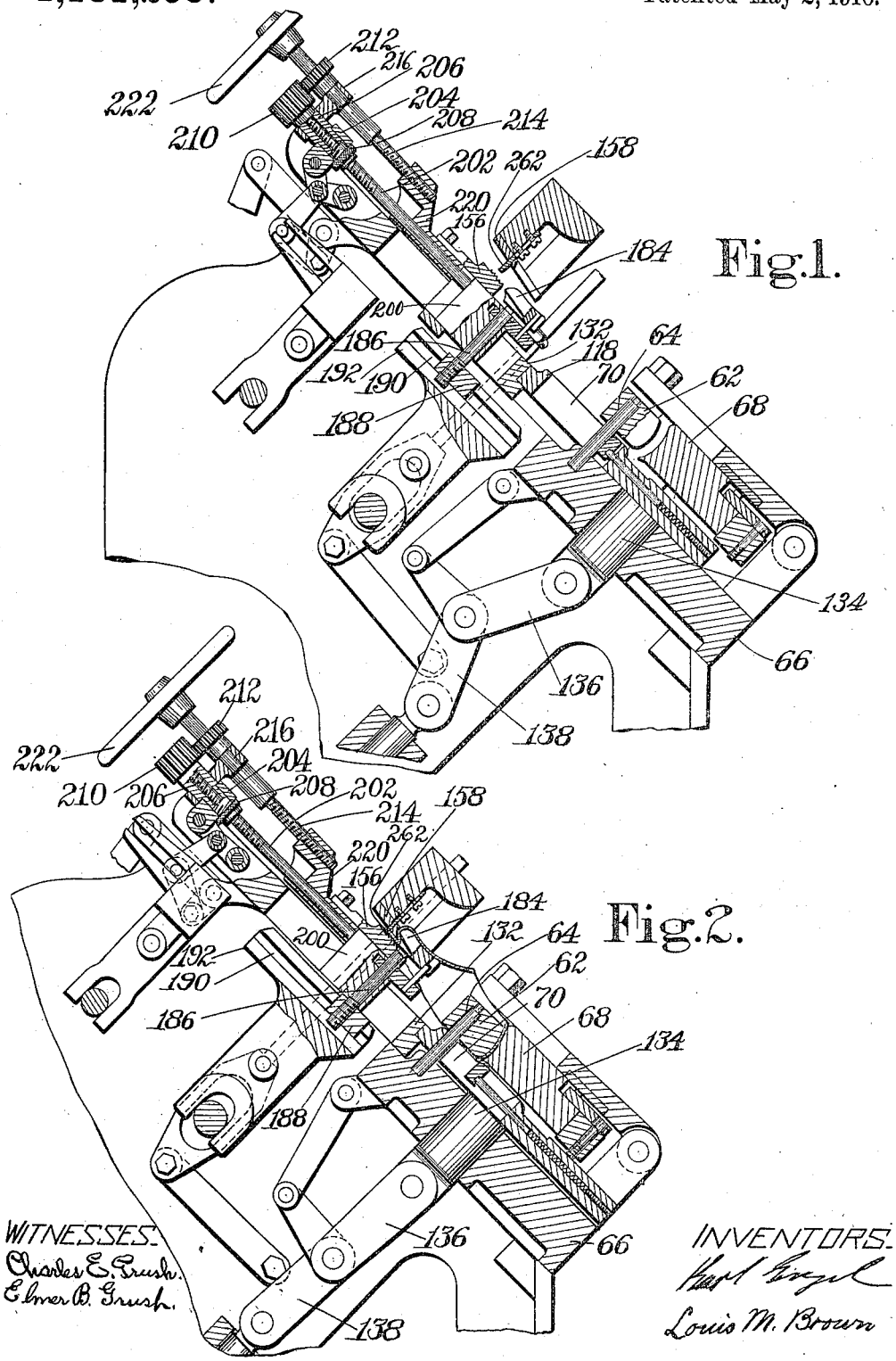

KARL ENGEL, OF ARLINGTON HEIGHTS, AND LOUIS M. BROWN, OF BEVERLY, MASSACHUSETTS, ASSIGNORS TO UNITED SHOE MACHINERY COMPANY, OF PATERSON, NEW JERSEY, A CORPORATION OF NEW JERSEY.

PROCESS OF MAKING SHOES.

1,181,295.          Specification of Letters Patent.          Patented May 2, 1916.

Original application filed November 27, 1908, Serial No. 464,559. Divided and this application filed August 31, 1914. Serial No. 859,422.

*To all whom it may concern:*

Be it known that we, KARL ENGEL and LOUIS M. BROWN, citizens of the United States, residing at Arlington Heights, in the county of Middlesex and State of Massachusetts, and Beverly, in the county of Essex and State of Massachusetts, respectively, have invented certain Improvements in Processes of Making Shoes, of which the following description, in connection with the accompanying drawings, is a specification, like reference characters on the drawings indicating like parts in the several figures.

This invention relates to processes of making shoes, and particularly to a process of making shoes which involves stretching and shaping a shoe upper substantially to the form which it is to have in the finished shoe before the last is inserted in said upper.

Although the invention is herein illustrated and described in its application to the shaping of shoe uppers having outturned sole attaching flanges, such as are employed in the manufacture of shoes of the type commonly termed "stitch down," it will be obvious that the invention is of equal applicability to the shaping of uppers of other types of shoes, such, for example, as Goodyear or McKay shoes.

Owing to the rapid increase in the cost of shoe materials, and particularly of upper leather, it is important that the stretching and shaping of a shoe upper be performed in such manner that the upper may be cut as closely to its final size as possible before the shaping operations, thus avoiding the waste material that is trimmed off after the ordinary lasting operations.

To this end the invention contemplates not only the shaping of those parts of a shoe which are particularly difficult to shape, but also the stretching of the upper which it is essential should be performed in order that the upper may maintain its shape in the finished shoe.

A particular object of the invention is to perform the shaping operations in such succession that the stretching operations will be incidental to the shaping operations.

Although the invention may be practised to some extent by hand by the use of various well-known tools, it may be practised more advantageously by the use of a machine of the type shown in our co-pending application Ser. No. 464,559, filed November 27, 1908, for Letters Patent for improvements in machines for use in the manufacture of boots and shoes, of which application the present application is a division. For a better understanding of the invention, so much of the machine of said co-pending application, as is necessary to illustrate the manner of performing the different steps of the process of the present invention and the sequence of these steps, is shown in the accompanying drawings, in which—

Figure 1 is a longitudinal section through one of the molding mechanisms of the machine of said co-pending application, showing the parts in position to receive the shoe upper; and Fig. 2 is a similar section of the machine, showing the parts after the molding and stretching operations have been performed upon the upper, an upper being shown in molded and stretched condition in this figure.

As hereinabove suggested, the invention comprises shaping the more difficult parts of the shoe upper, such for example as the heel and toe ends of the upper, substantially to the form which they are to have in the finished shoe and stretching the upper before the insertion of the last. According to the preferred manner of practising the invention herein to be described, one end of the upper is molded to shape and then the other end, and after the initial molding of that end of the upper last to be shaped the stretching of the upper is effected. Preferably, according to the present invention, the molding and stretching operations are performed before the attachment of a sole, either an insole or an outsole.

The machine herein shown for practising the process of the present invention comprises a toe forming mechanism and a heel forming mechanism arranged to operate in succession, the heel of the upper being preferably shaped first and then the toe. As herein shown these mechanisms are preferably so arranged that the toe of the upper points upwardly, the support for the mechanisms being so inclined that the operator may easily inspect the work while the process is being performed upon it. Only so much of these mechanisms is shown as is necessary for an understanding of the present invention, the machine as a whole being fully described in the co-pending application hereinabove referred to.

The principles of operation of the heel forming mechanism and of the toe forming mechanism herein shown are substantially the same as those of the corresponding mechanisms disclosed in United States Letters Patent No. 1,027,408, granted May 28, 1912, on application of Karl Engel for improvements in machines for forming uppers of boots and shoes, and No. 998,682, granted July 25, 1911 on application of Karl Engel for improvements in machines for forming uppers of boots and shoes, respectively.

The heel forming mechanism herein shown comprises a heel former or male mold 62, mounted upon a pin 64 projecting upwardly from the inclined table 66 into a socket in the former 62. Embracing this male mold is a female mold which comprises two jaw-like members 68 which rest upon guides, not shown, upon each side of a slide 70 upon which is formed or carried the flange turner 118 which serves to turn out upon the female mold a sole attaching flange upon the upper. The female mold members 68 are closed upon the sides of the male mold 62 and are moved up against the rear end of said male mold member by mechanism shown and described in said co-pending application, and after this molding operation the slide 70 is moved toward the rear end of the male mold member to wipe out the projecting lower edge of the upper to form the outturned flange, after which said slide is pressed up into the position shown in Fig. 2 to press out the flange upon the bottom face of the female mold and over the downwardly projecting inner edge of said mold. This pressing operation is effected through the action upon the slide 70 of the plunger 134 connected to a toggle 136, 138 which toggle is straightened and broken by mechanism more fully shown and described in said co-pending application. During the movement of the slide 70 to effect the flange turning operation, the toe forming mechanism, which, up to this time, has been out of the way of the operator, is moved down into position to act upon the upper, this mechanism comprising, as more fully set forth in said co-pending application, two clamp members 156 and 158 constructed and arranged to clamp a marginal portion of the toe part of the upper of a width substantially equal to the desired width of the flange to be formed upon the said toe part of the upper, and a toe former 184, adapted to shape the portion of the upper lying within the clamped portion. After the toe end of the upper has been placed over the former 184 and between the clamp members 156 and 158, the edge of the upper being shoved against the gage member 262 to gage the width of the flange to be formed, the upper clamp member 158 is moved down into clamping relation to the lower member 156 by mechanism more fully described in said co-pending application, and the toe former 184 has then imparted to it first an upward movement to mold the upper to the shape of said former, and then a forward movement to bulge the toe end of the upper over the flange and at the same time to effect a longitudinal stretching of the upper. The mechanism for effecting these two movements of the toe former is fully shown and described in said co-pending application, these movements of the former being permitted by its mounting upon a rod 186 adjustably carried in a slide 188 which is guided for movement longitudinally of the upper in guide grooves 190 in a slide 192 arranged to move at right angles to the direction of movement of the slide 188.

In order to adapt the machine hereinabove described for molding and stretching shoes of different lengths, the toe forming mechanism is adjustable upon its slide 132 which is connected to the flange former slide 70 to vary the distance apart of the heel and toe forming mechanisms after the movement of the toe forming mechanism into operative position during the flange turning operation. The adjustment of the toe forming mechanism to adapt it to shoes of different lengths is effected through the following means:—A slide 200, carried by the slide 132, is provided with an opening through which passes the rod 186 and through which said rod moves during the movement of the toe former transverse to the plane of the clamped portion of the upper, said slide 200 being adjustably connected by a rod 202 to a toggle-actuated member 204, the adjustable connections between the rod 202 and the rod 204 comprising a threaded sleeve 206 on a shouldered portion of which the member 204 is confined by a nut 208, said sleeve being arranged to be turned by a gear 210 geared to the second gear 212 upon the shaft 214 confined in a bearing 216 in an upstanding lug upon the slide 132. The turning of the sleeve 206 alone serves to adjust the toe former 184 with respect to the clamp members 156 and 158. These clamp members are, however, carried upon a third slide 220 into an upstanding portion of which the shaft 214 is threaded whereby, when said shaft is turned by the hand wheel 222, said slide 220 is adjusted upon the slide 132. The threads upon the shaft 214 are all of the same pitch as those upon the rod 202, and the gears 210 and 212 have the same number of teeth, so that, when the shaft 214 and the sleeve 206 are turned together, there will be no relative adjusting movement of the toe former 184 and the clamp members 156 and 158. When it is desired to adjust the position of the toe former with respect to the clamping members 156 and 158, the gear 212 may be disconnected from the shaft 214 and slipped along said shaft out of engagement with the gear 210, whereby the sleeve 206 may be turned without turning the shaft 214.

The upper having been placed in position about the former 62 and the machine having been actuated in the manner described in said co-pending application, the members 68 of the female mold will be moved through the operating connections described in said co-pending application into clamping and shaping engagement with the upper upon the former 62. After the upper has been clamped about the former 62, the slide 70 will be moved downwardly or toward the back part of the upper to cause the flange turner 118 upon the slide 70 to engage and turn out that portion of the heel end of the upper which projects below the female mold, the slide 70 being so located with respect to said female mold as to serve as a gage to determine the width of the heel flange. When the flange turner slide 70 has completed its flange turning movement and the plunger 134 has caused it to be moved into flange pressing relation to the female mold, the operator places the toe end of the upper over the toe former 184, which has been moved into operative relation to the heel forming mechanism during the flange turning operation, and again actuates the machine which, as described in said co-pending application, is arranged to stop at the end of the heel forming operation. During this second step in the operation of the machine, the clamp 158 is moved into clamping relation to the clamp member 156 and the toe former 184 is moved upwardly and then forwardly, thus shaping the toe end of the upper and then stretching the whole upper which is held against forward movement by reason of its having its end confined in the heel forming mechanism. This position of the parts of the toe and heel forming mechanisms is illustrated in Fig. 2 of the drawings and an upper is shown in this figure in molded and stretched condition in the machine.

Having described our invention, what we claim as new and desire to secure by Letters Patent of the United States is:—

1. That improvement in the art of making shoes which consists in molding to shape the heel and toe ends of a shoe upper off the last and stretching the upper before the attachment of a sole.

2. That improvement in the art of making shoes which consists in molding to shape the heel and toe ends of a shoe upper and stretching said upper longitudinally before the attachment of a sole.

3. That improvement in the art of making shoes which comprises molding to shape the heel and toe ends of a shoe upper and then stretching said upper.

4. That improvement in the art of making shoes which comprises molding to shape the heel and toe ends of a shoe upper and then stretching said upper longitudinally.

5. That improvement in the art of making shoes which comprises shaping one end of a shoe upper substantially to the shape which it is to have in the finished shoe, then shaping the other end of the shoe upper substantially to the shape which it is to have in the finished shoe, and as said second shaping operation is completing, stretching said upper longitudinally.

6. That improvement in the art of making shoes which comprises confining the heel end of a shoe upper and then forming in the toe end of said upper a toe in such manner that a longitudinal stretch is given to said upper.

7. That improvement in the art of making shoes which comprises confining the heel end of a shoe upper, then confining a marginal portion of the toe end of said upper and forming in the unconfined portion of said toe end a toe in such manner that a longitudinal stretch is given to said upper.

8. That improvement in the art of making shoes which comprises confining the heel end of a shoe upper and while it is confined forming thereon an outturned flange and then confining the marginal portion of the toe end of said upper and while both the heel end and the marginal portion of the toe end are thus confined forming a toe on the unconfined portion of the toe end of the upper.

9. That improvement in the art of making shoes which comprises confining the heel end of a shoe upper and while it is thus confined forming a flange thereon, confining the marginal portion of the toe end of said upper, effecting a relative movement between the confined and unconfined portions of said toe part of the upper in a direction substantially transverse to the plane of said confined portions, and then effecting a relative movement of said confined portions in a direction substantially parallel to said plane whereby a longitudinal stretch is given to the upper.

In testimony whereof I, the said KARL ENGEL, have signed my name to this specification in the presence of two subscribing witnesses.

KARL ENGEL.

Witnesses:
 CHARLES W. COOPER,
 ALBERT A. SMITH.

In testimony whereof I, the said LOUIS M. BROWN, have signed my name to this specification in the presence of two subscribing witnesses.

LOUIS M. BROWN.

Witnesses:
 CHARLES E. GRUSH,
 ELMER B. GRUSH.

Copies of this patent may be obtained for five cents each, by addressing the "Commissioner of Patents, Washington, D. C."